(12) United States Patent
Dunton et al.

(10) Patent No.: US 7,535,478 B2
(45) Date of Patent: May 19, 2009

(54) METHOD AND APPARATUS TO COMMUNICATE GRAPHICS OVERLAY INFORMATION TO DISPLAY MODULES

(75) Inventors: Randy R. Dunton, Phoenix, AZ (US); Eric Auzas, Phoenix, AZ (US); Nicholas J. Stasik, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 97 days.

(21) Appl. No.: 10/746,424

(22) Filed: Dec. 24, 2003

(65) Prior Publication Data
US 2005/0140695 A1 Jun. 30, 2005

(51) Int. Cl.
*G09G 5/00* (2006.01)
(52) U.S. Cl. .............. 345/629; 345/660; 345/661; 358/1.9; 358/518; 358/525
(58) Field of Classification Search ......... 345/629, 345/660–661; 348/584; 358/1.9, 518–525
See application file for complete search history.

(56) References Cited

U.S. PATENT DOCUMENTS

| | | | | |
|---|---|---|---|---|
| 6,157,415 A | * | 12/2000 | Glen | 348/599 |
| 6,326,984 B1 | * | 12/2001 | Chow et al. | 715/764 |
| 6,621,449 B1 | | 9/2003 | Kunert | |
| 6,621,499 B1 | * | 9/2003 | Callway | 345/629 |
| 6,707,505 B2 | * | 3/2004 | Kuo et al. | 348/584 |
| 6,768,774 B1 | * | 7/2004 | MacInnis et al. | 375/240.15 |
| 6,828,987 B2 | * | 12/2004 | Swan | 345/660 |
| 6,996,838 B2 | * | 2/2006 | Rodriguez | 725/95 |
| 2003/0079919 A1 | | 5/2003 | Hochmuth et al. | |
| 2005/0097451 A1 | * | 5/2005 | Cormack et al. | 715/512 |

FOREIGN PATENT DOCUMENTS

WO     WO 01/45426 A     6/2001

OTHER PUBLICATIONS

PCT International Search Report, International App. No. PCT/US2004/043739, Date of Completion: Aug. 26, 2005, Date of Mailing: Sep. 5, 2005, pp. 1-4.

* cited by examiner

*Primary Examiner*—Jin-Cheng Wang
(74) *Attorney, Agent, or Firm*—Kacvinsky LLC

(57) ABSTRACT

A method and apparatus to communicate graphics information are described.

20 Claims, 6 Drawing Sheets

METHOD AND APPARATUS TO COMMUNICATE GRAPHICS OVERLAY INFORMATION TO DISPLAY MODULES

BACKGROUND

A media center may provide various functions for a display unit, such as a television. For example, the media center may receive and decode video signals for display on the television. In another example, the media center may simultaneously display graphics and video on the television, such as drawing a transparent or translucent graphic over a video image. Techniques to provide such functionality, however, may grow increasingly complex in relation to the number of display units supported by the media center. The complexity may result in inefficient use of resources for the media center, such as processors, memory and communication buses. Consequently, improvements in using media center resources may lead to improved performance for the media center. Accordingly, there may be a need for improvements in such techniques in a device or network.

BRIEF DESCRIPTION OF THE DRAWINGS

The subject matter regarded as the embodiments is particularly pointed out and distinctly claimed in the concluding portion of the specification. The embodiments, however, both as to organization and method of operation, together with objects, features, and advantages thereof, may best be understood by reference to the following detailed description when read with the accompanying drawings in which:

DETAILED DESCRIPTION

Numerous specific details may be set forth herein to provide a thorough understanding of the embodiments of the invention. It will be understood by those skilled in the art, however, that the embodiments of the invention may be practiced without these specific details. In other instances, well-known methods, procedures, components and circuits have not been described in detail so as not to obscure the embodiments of the invention. It can be appreciated that the specific structural and functional details disclosed herein may be representative and do not necessarily limit the scope of the invention.

It is worthy to note that any reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
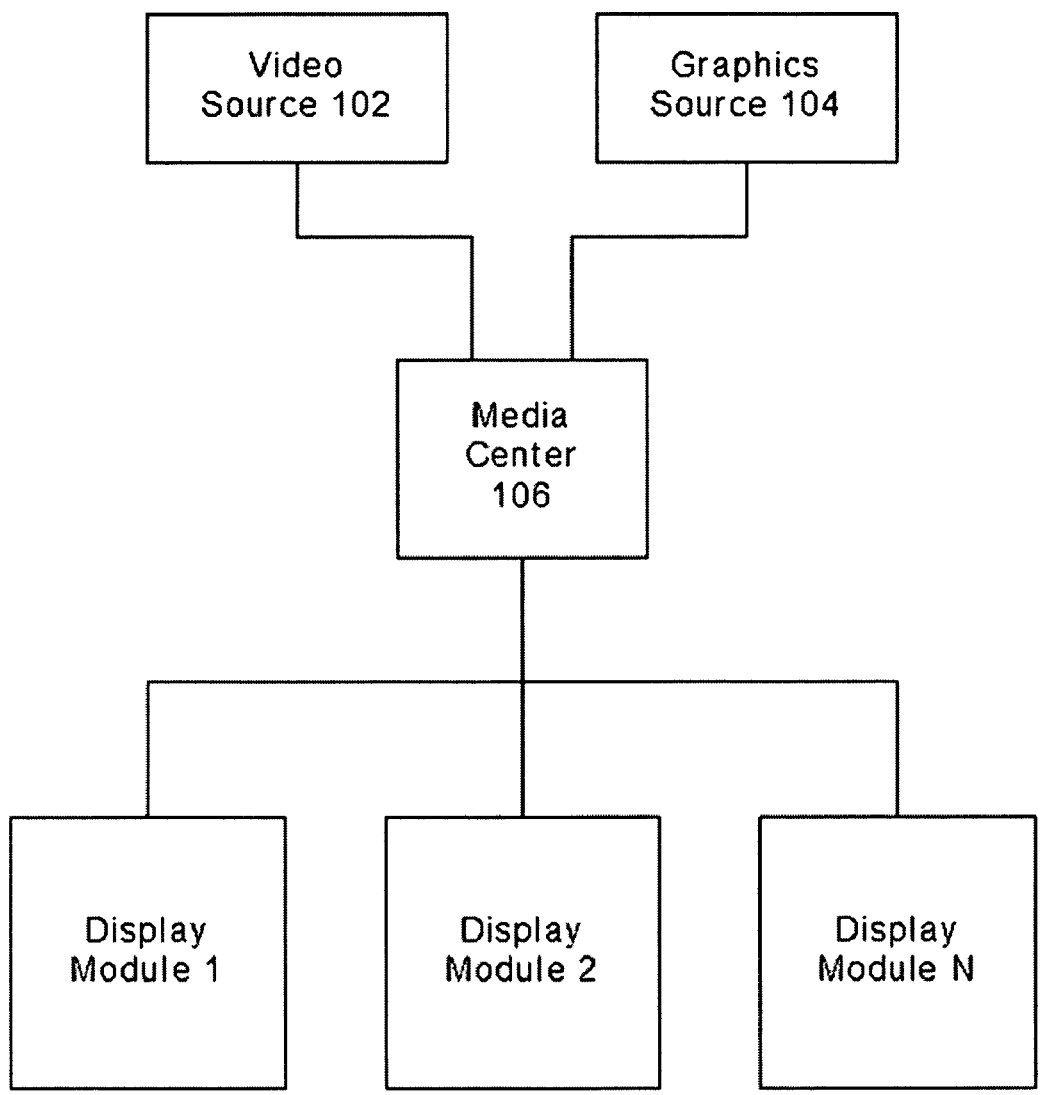
FIG. 1 illustrates a system suitable for practicing one embodiment.

Referring now in detail to the drawings wherein like parts are designated by like reference numerals throughout, there is illustrated in FIG. 1 a system suitable for practicing one embodiment. FIG. 1 is a block diagram of a system 100. System 100 may comprise a plurality of network nodes. The term "network node" as used herein may refer to any node capable of communicating information in accordance with one or more protocols. Examples of network nodes may include a computer, server, video system, audio system, graphics system, display modules, media center, switch, router, bridge, gateway and so forth. The term "protocol" as used herein may refer to a set of instructions to control how the information is communicated over the communications medium.

In one embodiment, system 100 may communicate various types of information between the various network nodes. For example, one type of information may comprise media information. As used herein, the term "media information" may refer to any data representing content meant for a user. Examples of content may include, for example, video, streaming video, audio, streaming audio, graphics, image, alphanumeric symbols, text, and so forth. Another type of information may comprise control information. The term "control information" as used herein may refer to any data representing commands, instructions or control words meant for an automated system. For example, control information may be used to route media information through a network, or instruct a network node to process the media information in a predetermined manner.

In one embodiment, one or more descriptors may be used for the information. A descriptor is a data structure recognizable by the software or underlying hardware that describes an operation to use or transport the media information or control information. The descriptor may comprise one or more segments. A segment may be a field within the data structure to represent a specific piece of media information or control information. The segment may comprise, for example, a control segment, address segment, and data segments. In one embodiment, for example, the descriptor may comprise a control block or content block. The term "control block" as used herein may refer to a field used to convey control information. The term "content block" as used herein may refer to a field to convey media information. The control block may comprise all or part of a control segment for a descriptor data structure, while a content block may comprise all or part of a data segment for a descriptor data structure.

In one embodiment, one or more communications mediums may connect the nodes. The term "communications medium" as used herein may refer to any medium capable of carrying information signals. Examples of communications mediums may include metal leads, semiconductor material, twisted-pair wire, co-axial cable, fiber optic, radio frequencies (RF) and so forth. The terms "connection" or "interconnection," and variations thereof, in this context may refer to physical connections and/or logical connections.

Referring again to FIG. 1, system 100 may comprise a video source 102, a graphics source 104, a media center 106, and display modules 1-N. These network nodes may be connected together via one or more communication mediums. Although FIG. 1 shows a limited number of network nodes, it can be appreciated that any number of network nodes may be used in system 100.

In one embodiment, system 100 may comprise video source 102. Video source 102 may comprise any video system configured to source analog or digital video information. The term "video information" may refer to a subset of media information to include data and information from a video. Examples of video information may include content from a video program, computer generated images (CGI), and so forth. Examples of video source 102 may include any system or device to deliver pre-recorded media stored in various formats, such as a Digital Video Disc (DVD) device, VHS device, Digital VHS device, computer, gaming console, and so forth. Video source 102 may also include multimedia distribution systems to provide broadcast or streaming analog or digital video information to media center 106. Examples of multimedia distribution systems may include, for example, Over The Air (OTA) broadcast systems, terrestrial cable systems, satellite broadcast systems, and so forth. The types and locations of video source 102 are not limited in this context.

It is worthy to note that audio information may also be included with the video information. The audio information may be embedded with the video information in a single media stream, or in different video and audio streams. As used herein, the term video information may be meant to include or exclude audio information, as desired for a given implementation. The embodiments are not limited in this context.

In one embodiment, system 100 may comprise graphics source 104. Graphics source 104 may comprise any equipment configured to source overlay information. The term "overlay information" as used herein may refer to any media information to be overlayed or placed over video information. The overlay information may be opaque or have varying degrees of transparency as desired for a given implementation. Examples of overlay information may include graphics or text, such as representing a menu of items for controlling video source 102, graphics source 104, media center 106, display module 1-N, and so forth. Another example of overlay information may also include video information, such as for providing picture-in-picture (PIP) functionality. Yet another example may be graphics from a gaming application or device. In these and other examples, both the video information and overlay information may be simultaneously displayed and viewed by a user. The embodiments are not limited in this context.

It is worthy to note that although graphics source 104 may be shown as a separate network node for purposes of clarity, it may be appreciated that graphics source 104 may also be integrated with media center 106 and still fall within the scope of the embodiments. For example, graphics source 104 may be integrated with a graphics processing sub-system, such as graphics processing sub-system 224 discussed with reference to FIG. 2.

In one embodiment, system 100 may comprise display modules 1-N. A display module may include any equipment configured to display video information. Examples of a display module may comprise a television, computer with a monitor, and so forth. In one embodiment, display modules 1-N may be configured to operate in accordance with different display or frame formats, such as one or more Digital Television (DTF) formats as defined by the Advanced Television Systems Committee (ATSC).

In one embodiment, for example, a display module may be configured to operate in accordance with the Standard Definition Television (SDTV) format. The SDTV format may comprise the DTV format of 480i/30. It may be equivalent to interlaced video output of DVD-Video aspect ratio. SDTV uses a data rate of approximately 4-7 Megabits Per Second (Mbps), so three to six SDTV channels can be communicated using approximately the same bandwidth as a High Definition Television (HDTV) channel.

In one embodiment, for example, a display module may be configured to operate in accordance with the Enhanced Definition Television (EDTV) format. The EDTV format may provide better picture quality than SDTV at the cost of using more bandwidth. EDTV may comprise various formats offering varying degrees of picture quality. The vertical resolution is typically limited to 480 lines, although horizontal resolution may vary between 640 to 704 vertical lines. EDTV may encompass both 4:3 and 16:9 aspect ratios, a number of refresh rates, and both interlaced and progressive scanning.

In one embodiment, for example, a display module may be configured to operate in accordance with the HDTV format. HDTV may use a data rate of approximately 25 to 27 Mbps for enhanced picture quality relative to SDTV and EDTV. All HDTV formats are in the 16:9 aspect ratio. The 720 line vertical resolution may use progressive scanning at various refresh rates. The highest resolution is commonly used in interlaced scanning mode (e.g., 1080i), due to limitations of conventional broadcast and consumer equipment.

In one embodiment, system 100 may comprise media center 106. Media center 106 may comprise a processing system to manage media and control information for system 100. Media center 106 may comprise a processor and memory. Media center 106 may also comprise a number of input/output (I/O) devices, such as a hard drive, compact disc (CD) drive, DVD drive, and so forth. Media center 106 may also comprise a number of communication interfaces to interface with, for example, video source 102, graphics source 104, and display modules 1-N.

In general operation, media center 106 may receive and decode video information from video source 102 and overlay information from graphics source 104. Media center 106 may receive a command to display the overlay information over the video information. For example, the command may be received from a user pressing a "menu" button on a television remote control. Media center 106 may blend the overlay information with the video information in varying degrees of translucency so that the overlay information and video information may be simultaneously viewed by a user.

In one embodiment, media center 106 may support a plurality of display modules 1-N. Further, each display module may be configured to simultaneously display video and overlay information in accordance with varying display formats, such as SDTV, EDTV and HDTV, for example. Consequently, media center 106 may be configured to receive multiple streams of video information to be displayed on multiple display modules with varying display formats, and blend the different streams of video information with overlay information. Media center 106 may send the blended information to the appropriate display module from display modules 1-N. Display modules 1-N may receive the blended information from media center 106, and display the blended information for viewing by a user. System 100 in general, and media center 106 in particular, may be described in further detail with reference to FIGS. 2-6.

Figure 2:
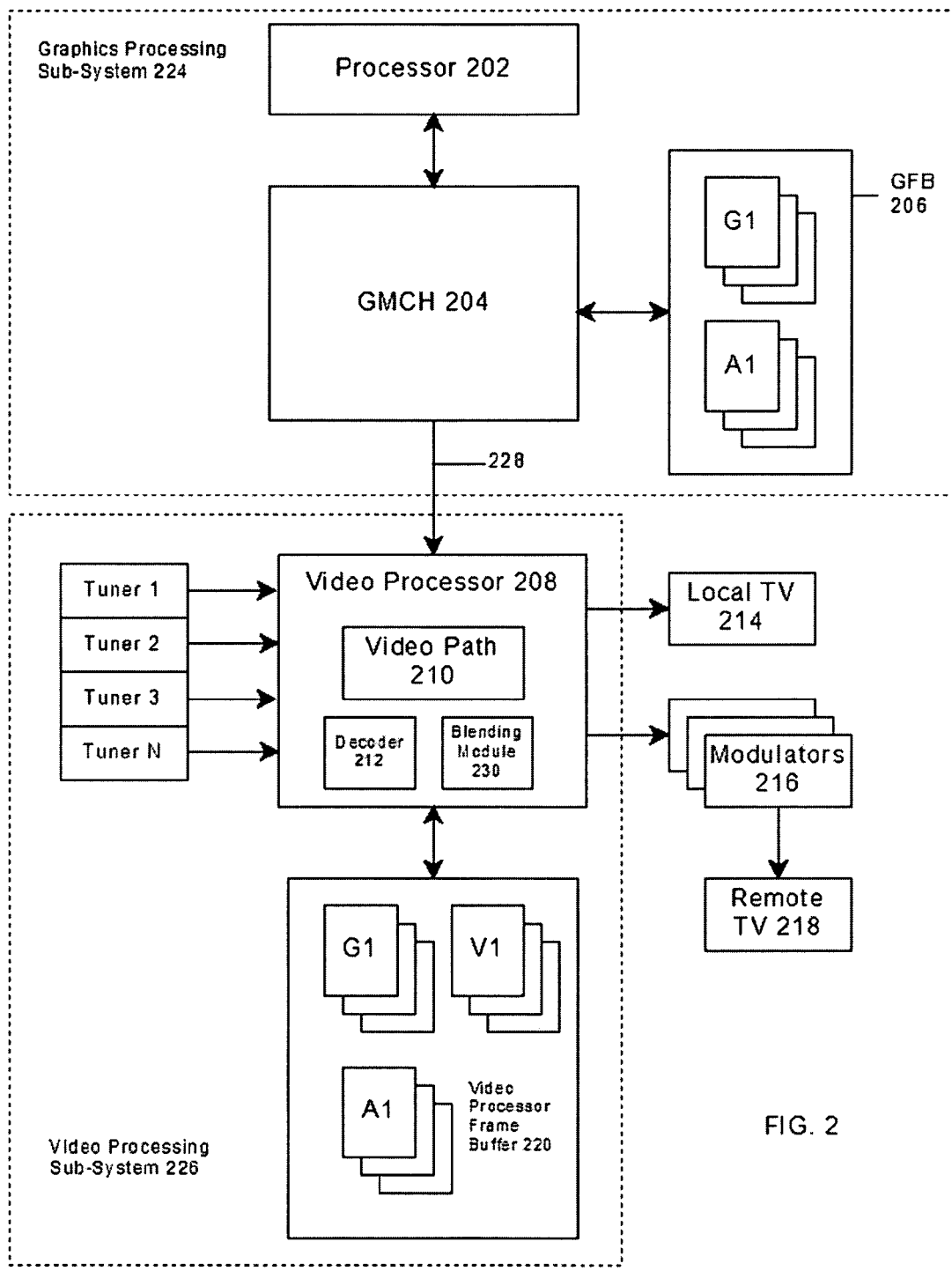
FIG. 2 illustrates a block diagram of a media center in accordance with one embodiment.

FIG. 2 may illustrate a media center in accordance with one embodiment. FIG. 2 may illustrate a media center 200. Media center 200 may be representative of, for example, media center 106. Media center 200 may comprise a plurality of modules. The term "module" as used herein may refer to an element, component, board, device or system that may process a signal representing information. The signal may be, for example, an electrical signal, optical signal, acoustical signal, chemical signal, and so forth. Although the embodiment has been described in terms of "modules" to facilitate description, one or more circuits, components, registers, processors, software subroutines, or any combination thereof could be substituted for one, several, or all of the modules.

In one embodiment, media center 200 may be configured to support a plurality of display modules having different display formats. For example, a local television 214 may comprise a television to display HDTV signals. In another example, remote televisions 218 may comprise televisions to display SDTV signals. It may be appreciated that these display formats are used by way of example only, and the embodiments are not necessarily limited in this context.

Since media center 200 is configured to support multiple display modules, there may be a need to render multiple sets of overlay information with multiple sets of video information. To facilitate such rendering, media center 200 may utilize two discrete sub-systems with separate memories. In one embodiment, for example, media center 200 may comprise a graphics processing sub-system 224 and a video processing sub-system 226. Although only two sub-systems are shown in FIG. 2, it may be appreciated that other sub-systems may also be included with media center 200. The embodiments are not limited in this context.

In one embodiment, for example, graphics processing sub-system 224 may comprise a processor 202, a graphics memory and controller hub (GMCH) 204, and a graphics frame buffer 206. Graphics processing sub-system 224 may receive, store and manage overlay information received via graphics source 104. The overlay information may comprise graphics planes G1 and alpha planes A1. The graphics plane may comprise two or three dimensional graphics specifying a color definition utilizing three components, such as red, green, blue (RGB). The red, green and blue components may represent actual colors. The alpha plane may comprise alpha (A) components. The alpha components may represent a blending factor to indicate a level of transparency for the overlay information. In one embodiment, the combined RGBA information may be stored using 32 bits per pixel, 8 bits for each R, G, B and A components, for example. The graphics plane may also be represented utilizing other color space coding techniques, such as $Y'C_BC_R$, for example.

Figure 3:
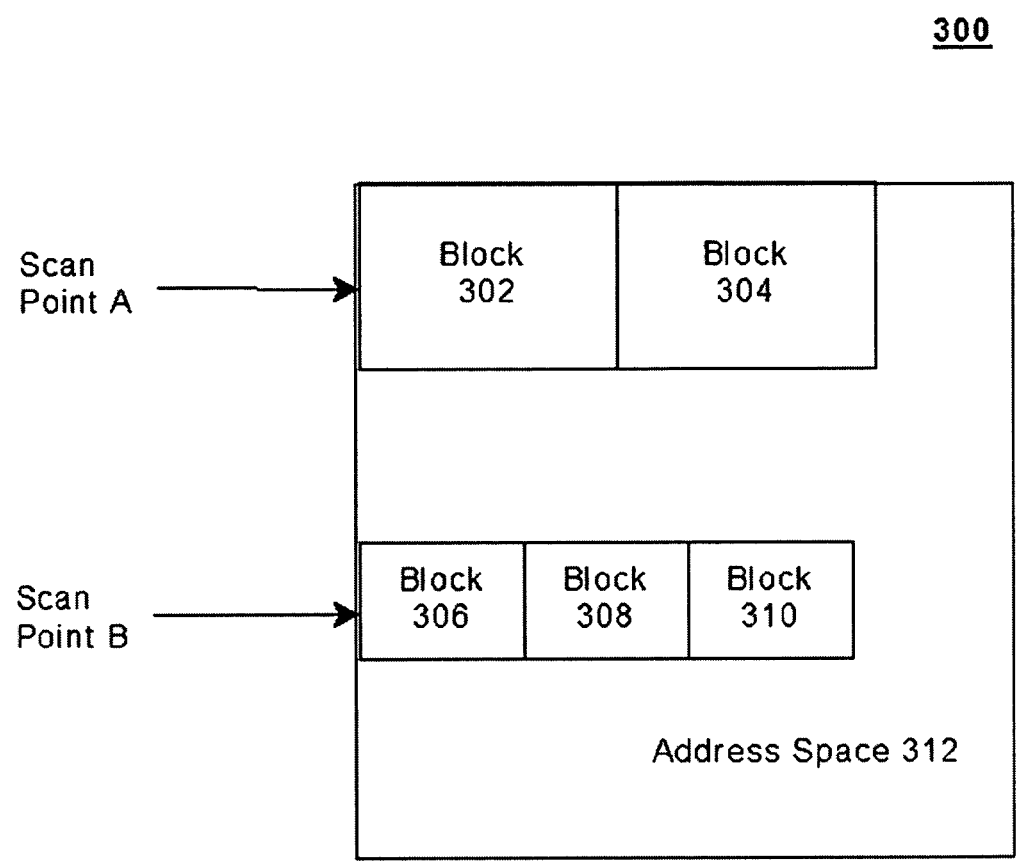
FIG. 3 illustrates a logical representation for a graphic frame buffer for the media center in accordance with one embodiment.

FIG. 3 illustrates a logical representation 300 for a graphic frame buffer for the media center in accordance with one embodiment. As shown in FIG. 3, the graphics planes G1 may be stored in graphics frame buffer 206. The RGBA graphics planes G1 may be organized in graphics frame buffer 206 in a logical two dimensional address space (x/y) 312. For example, logical representation 300 illustrates a first set of blocks 302 and 304 stored in one part of address space 312, and a second set of blocks 306, 308 and 310 in a different part of address space 312. The first and second sets of blocks may represent different graphics planes organized so that similar graphics planes are grouped together in different refresh rate domains. For example, blocks 302 and 304 may represent HDTV graphics planes. The HDTV graphics planes may each comprise a 1920×1080 or 1280×720 block of pixels. The HDTV graphics planes may be stored together in a first refresh rate domain of 24 Hertz (Hz) of address space 312. In another example, blocks 306, 308 and 310 may represent SDTV graphics planes. The SDTV graphics planes may each comprise a 720×480 block of pixels. The SDTV graphics planes may be stored together in a second refresh rate domain of 60 Hz of address space 312. It may be appreciated that the first refresh rate domain and the second refresh rate domain may not necessarily use different refresh rates, and in one case may use the same refresh rate for a given implementation. For efficiency it may be desired to create rectangular regions to reduce the possibility of transferring unused pixels. It may be appreciated that these values are used by way of example only, and are not meant to limit the scope of the embodiments.

In one embodiment, the RGBA data for each graphics plane G1 may be transferred out of address space 312 of graphics frame buffer 206 using a raster scan technique. The raster scan technique retrieves the RGBA data from left to right and top to bottom, as indicated by scan points A and B. The transfer operation may be discussed in more detail with reference to FIGS. 4-6.

In one embodiment, for example, video processing sub-system 226 may comprise a video processor 208, tuners 1-N, and a video processor frame buffer 220. Video processing sub-system 226 may further comprise a plurality of display modules, such as local television 214 and remote televisions 218. The term "local television" as used herein may refer to a display module co-located with media center 200. The term "remote television" as used herein may refer to a display module remotely located from media center 200. Remote televisions 218 may receive signals from video processor 208 via modulators 216. Alternatively, signals from video processor 208 may be sent to remote televisions 218 without modulators 216, such as through a Local Area Network (LAN). Video processor 208 may comprise a video path 210, a decoder 212 and a blending module 230.

In one embodiment, video processor 208 may comprise video decoder 212. Video processor 208 may receive video information from video source 102 via tuners 1-N. Decoder 212 may decode the video information into video planes V1. Each video plane may comprise a video image represented using the RGB components. Video processor 208 may store the video planes in video processor frame buffer 220.

In one embodiment, video processor 208 may comprise blending module 230. Blending module 230 may be configured to perform alpha blending of graphics planes G1 with video planes V1 in accordance with alpha planes A1. Alpha blending is a technique used to provide transparency information for transparent or translucent objects, such as a graphic to be displayed on a television. In alpha blending, a resultant color of a pixel viewed on the display module is a combination of a foreground color and a background color. The foreground color may represent the color of the translucent object, e.g., the graphics plane G1. The background color may be the video information that is underneath the translucent object, e.g., the video plane V1. The alpha plane may comprise alpha components to blend the graphics plane with the video plane. The alpha values may be used to blend colors from the graphics plane and video plane on a pixel-by-pixel basis, to form a blended frame of information. The blended frame of information may then be displayed on a display module, such as local television 214 or remote televisions 218, for example.

In one embodiment, graphics processing sub-system 224 may render graphics at any desired frame rate needed to provide any graphic changes or animations. The video frame buffer may be integrated with the television video refresh rate, which is typically a higher rate than the graphic frame rate.

In one embodiment, graphics processing sub-system 224 may send graphics planes G1 and alpha planes A1 to video processing sub-system 226 over a bus 228. Both sub-systems may be configured with a bus interface to implement a bus protocol using bus 228. In one embodiment, for example, bus 228 may be a graphics overlay transfer bus operating in accordance with the Digital Video Output (DVO) Port Hardware External Design Specification (Eds) Ver. 2.0 specification developed by Intel® Corporation, as modified using the principles discussed herein.

In operation, graphics processing sub-system 224 and video processing sub-system 226 may be integrated to blend multiple graphics planes G1 with multiple video planes V1, with the video planes comprising video information for display modules using different display formats. The graphics planes may be generated to correspond to the different display formats, and may be of varying sizes within a given display format. The graphics planes G1 and video planes V1 may be blended to form blended frames, with the blended frames being in the appropriate display format for the destination display module. Video path 210 may receive the blended frames and send the blended frames to the appropriate display module, such as local television 214 and remote televisions 218.

Media center 200 may perform the blending operations in at least two modes. The first mode may be referred to herein as "real-time blending." The second mode may be referred to herein as "copy-blending." If real time blending is used, each refresh rate may require one video clock and bus. Display modules with common refresh rates may share the same video clock and data bus interface. These two modes may be discussed in more detail with reference to FIGS. 4-6.

The operations of systems 100 and 200 may be further described with reference to FIGS. 4-6 and accompanying examples. Although one or more of FIGS. 4-6 as presented herein may include a particular programming logic, it can be appreciated that the programming logic merely provides an example of how the general functionality described herein can be implemented. Further, the given programming logic does not necessarily have to be executed in the order presented unless otherwise indicated. In addition, although the given programming logic may be described herein as being implemented in the above-referenced modules, it can be appreciated that the programming logic may be implemented anywhere within the system and still fall within the scope of the embodiments.

Figure 4:
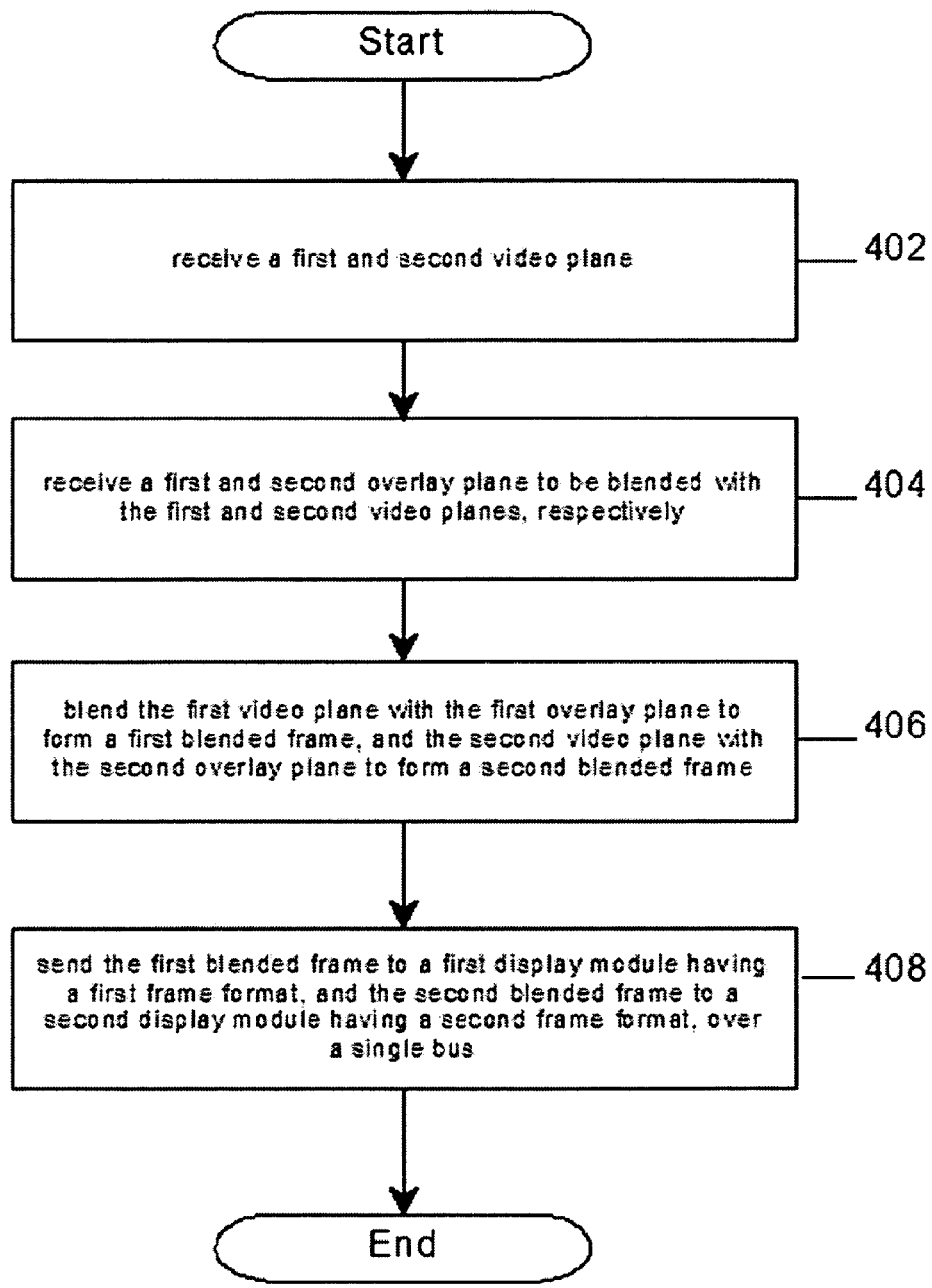
FIG. 4 illustrates a block flow diagram of the programming logic performed by a media center in accordance with one embodiment.

FIG. 4 illustrates a programming logic for a media center in accordance with one embodiment. FIG. 4 illustrates a programming logic 400. As shown in programming logic 400, a first and second video plane may be received at block 402. The received video planes may be stored in a video processor frame buffer, for example. A first and second overlay plane to be blended with the first and second video planes, respectively, may be received at block 404. The received overlay planes may be stored in a graphics frame buffer. The first video plane may be blended with the first overlay plane to form a first blended frame at block 406. The second video plane may also be blended with the second overlay plane to form a second blended frame at block 406. The first blended frame may be sent to a first display module having a first frame format at block 408. The second blended frame may also be sent to a second display module having a second frame format at block 408.

In one embodiment, the blending operation may occur using a copy-blending technique. For example, the overlay planes may be sent from graphics frame buffer 206 to video processor frame buffer 220. In copy blending, copying from 206 to 220 may occur at any rate desired for a given implementation that optimizes the memory bandwidth needs of graphics frame buffrr 206 by using the minimum rate. Video processor frame buffer 220, however, may need to send infonnation to blending module 230 in accordance with the refresh rate of local television 214 or remote televisions 216, which may require a higher bandwidth. For example, the overlay planes may a sent in accordance with some multiple of the vertical synchronization signal of the display module. The overlay planes may be stored in video processor frame buffer 220. The overlay planes and video planes may then be retrieved from video processor frame buffer 220 to perform the blending operations.

In one embodiment, the overlay planes may be sent from graphics frame buffer 206 to video processor frame buffer 220 using a vertical synchronization signal. On a leading edge or trailing edge of the vertical synchronization signal, a first control block may be sent from graphics frame buffer 206 to video processor frame buffer 220 over bus 228. The first control block may have a set of dimensions for the first overlay plane. At the next transition, a first content block containing the data for the first overly plane may be sent over bus 228. At another transition, a second control block may be sent over bus 228. The second control block may have a set of dimensions for the second overlay plane. At another transition, a second content block containing the data for the second overlay plane may be sent over bus 228.

In one embodiment, one overlay plane may have smaller dimensions than the other overlay plane. For example, the first overlay plane may be for an HDTV television, while the second overlay plane may be for a SDTV. As a result, one embodiment may send a plurality of the second overlay frames together in one or more content blocks before sending another control block. For example, a plurality of second overlay planes may be received and stored in graphics frame buffer 206. When ready for transfer, second overlay planes may be retrieved from graphics frame buffer 206, formed into the second content block, and sent over bus 228. In this manner, multiple second overlay planes may be transferred in the same time interval as one of the first overlay planes.

In one embodiment, the blending operation may occur using a real-time blending technique. For example, a first set of first overlay planes and a second set of second overlay planes may be received. The first set may be stored in a first refresh rate domain in graphics frame buffer 206. The second set may be stored in a second refresh rate domain in graphics frame buffer 206. The first set of overlay planes may be sent to blending module 230 in accordance with horizontal and vertical synchronization signals, and the second set may be sent to blending module 230 in accordance with the horizontal and vertical synchronization signals. Blending module 230 may blend the first video plane with an overlay plane from the first set of overlay planes to form the first blended frame, and the second video plane with an overlay plane from the second set of overlay planes to form the second blended frame. The blending may occur in real-time as the first and second sets are received at blending module 230.

In one embodiment, the first and second sets of overlay planes may be sent to blending module 230 in accordance with horizontal and vertical synchronization signals. This may occur by sending a first control block with a set of dimensions for the first set when the vertical synchronization signal changes state. The plurality of content blocks may be sent after the control block in accordance with the horizontal synchronization signal, with each content block having a line of the first set. This operation may be repeated when sending the second set of overlay planes.

The operation of systems 100 and 200, and the programming logic shown in FIG. 4, may be better understood by way of example. Assume media center 200 supports multiple televisions using different display formats. Further, assume media center 200 supports multiple graphics overlays for the different display formats. Media center 200 may utilize a bus interface to implement a bus protocol to improve bus performance, as well as reduce the associated pin count. The bus interface may be configured to operate in support of at least two blending modes of media center 200. The blending modes may comprise copy-blending and real-time blending.

Assume that media center 200 is configured to operate in copy-blending mode. The graphics planes containing RGBA pixels are transferred at a rate designed to reduce bandwidth demands on graphics frame buffer 206, e.g., 20 Hz. The graphics planes may be copied from graphics frame buffer 206 into video processor frame buffer 220. Video processor 208 may read the copied graphics planes from video processor frame buffer 220 to refresh the television screen operating at a refresh rate of 60 Hz. The graphics planes may be transferred over a single bus such as bus 228, and the clock for bus 228 may be driven by graphics processing sub-system 224.

Figure 5:
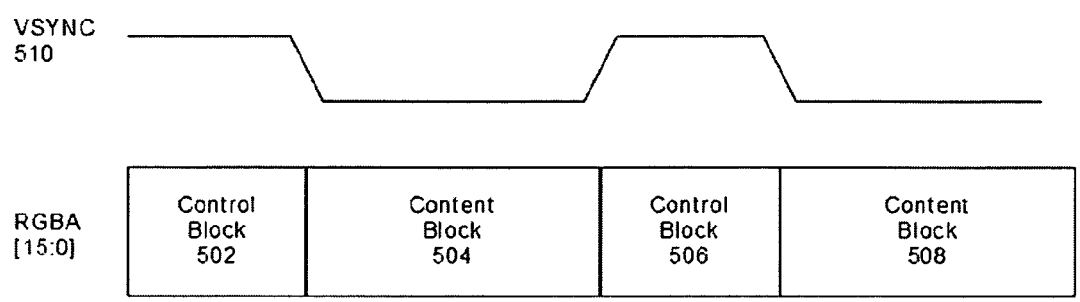
FIG. 5 illustrates a first timing diagram for communicating graphics information over a graphics bus in accordance with one embodiment.

FIG. 5 illustrates a first timing diagram for communicating graphics information over a graphics bus in accordance with one embodiment. FIG. 5 illustrates a timing diagram 500 for communicating graphics planes from graphics frame buffer 206 to video processor frame buffer 220 in a copy-blending mode. In the copy-blending mode of operation the dimensional properties of the blocks stored in the first refresh rate domain are sent in accordance with a vertical synchronization (VSYNC) 510. For example, the HDTV graphics planes are stored in the first refresh rate domain of address space 312. A control block 502 may be configured with control information indicating that the following content block 504 comprises HDTV graphics plane data having a source width of 1920, a source height of 1080, and a buffer select field set to zero (0). The buffer select field in this example may refer to blocks 302 and 304. Control block 502 may let video processing sub-system 226 identify what type of data is being communicated over bus 228, and also to determine where to store the received graphics planes in video processor frame buffer 220. Once control block 502 is sent, the HDTV graphics plane data from the first refresh rate domain (e.g., blocks 302 and 304) may be sent using content block 504. Once the HDTV graphics planes are sent over bus 228, control block 506 may be sent at another clock transition of VSYNC 510. Control block 506 may be configured with control information indicating that the following content block 508 comprises SDTV graphics plane data having a source width of 720, a source height of 1440, and a buffer select field set to one (1) indicating blocks 306, 308 and 310. Once control block 506 has been sent, the SDTV graphics plane data from the second refresh rate domain may be sent using content block 508. The three SDTV graphics planes each having a 720×480 dimension may be organized as 720 (x) by 1440 (y) for the transfer over bus 228. As shown in FIG. 5, it is possible to use a single bus 228 for the transfers since the video and graphics frame rates are decoupled in this architecture. It is also possible to switch between the various refresh rate domains using VSYNC 510.

It is worthy to note that content block 504 may be used to send 1 block of HDTV graphics plane data, while content block 508 may be used to send 3 blocks of SDTV graphics plane data. It may be appreciated, however, that these numbers may vary according to a number of factors, such as the display formats and refresh rates of the display modules used for a given implementation.

Assume that media center 200 is configured to operate in real-time blending mode. The graphics planes stored in graphics frame buffer 206 may be transferred to video processing sub-system 226 at a rate designed to synchronize with the video refresh rate of the television screen. The graphics planes may be transferred directly from graphics frame buffer 206 to blending module 230 of video processing sub-system 226 as needed to refresh the television screen, e.g. operating at 60 Hz. The real-time blending mode may reduce the bandwidth demand for video processor frame buffer 220. It is worthy to note that due to the sharing of bus 228 for all the transfers of one refresh rate domain, a line buffer may be needed by video processing sub-system 226.

Figure 6:
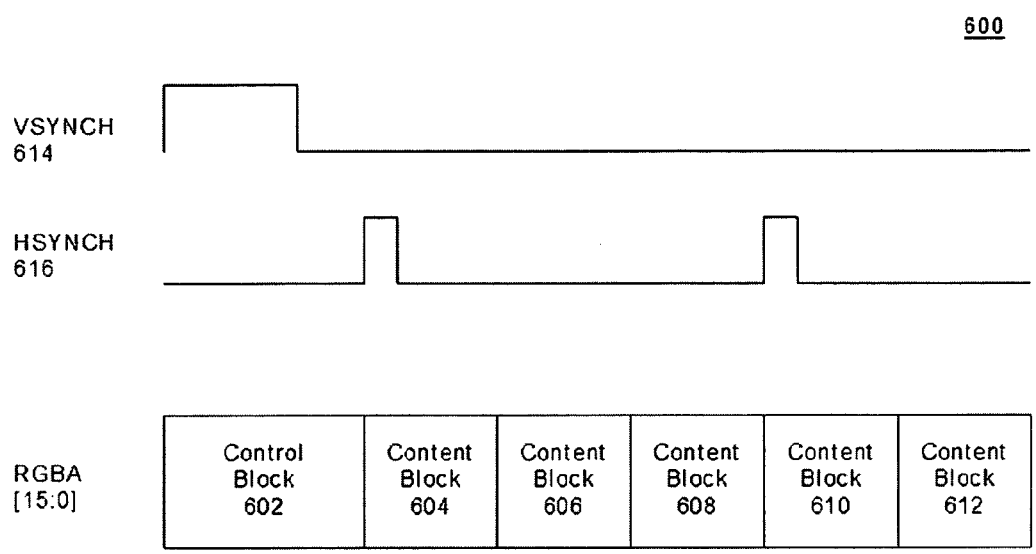
FIG. 6 illustrates a second timing diagram for communicating graphics information over a graphics bus in accordance with one embodiment.

FIG. 6 illustrates a second timing diagram for communicating graphics information over a graphics bus in accordance with one embodiment. FIG. 6 illustrates a timing diagram 600 for communicating graphics planes from graphics frame buffer 206 to video processor frame buffer 220 in a real-time blending mode. In real-time blending mode the graphics planes may be organized and stored in graphics frame buffer 206 in a manner similar to the copy-blending mode, but the data transfer operation may be different. A control block 602 may be configured with the dimensions of the refresh rate domain. For example, control block 602 may be configured with control information indicating that the following content blocks comprise SDTV graphics plane data having a source width of 1920, a source height of 480, and a buffer select field set to one (1). Control block 602 may be sent over bus 228 in accordance with VSYNC signal 614. Once control block 602 is sent, content blocks 604, 606, 608, 610 and 612 may be sent in accordance with a horizontal synchronization (HSYNC) signal 616. In accordance with HSYNC 616, a line of each of the SDTV graphics overlays (positioned horizontally next to each other in logical space) are transferred. As shown in FIG. 3, the second refresh rate region comprise 3 SDTV graphics planes, each having a dimension of 640×480, resulting in a 1920×480 grouped region. All 1920 (3×640) pixels are sent between each HSYNC pulse. Video processor 208 may have 3 line buffers to store this transfer. A separate HSYNC and RGBA interface may be needed to support screens with different refresh rates. The real-time blending transfer operations described above may be applied to all the refresh rate domains stored in graphics frame buffer 206, including the HDTV graphic planes represented by block 302 and 304, for example.

The embodiments may be implemented using an architecture that may vary in accordance with any number of factors, such as desired computational rate, power levels, heat tolerances, processing cycle budget, input data rates, output data rates, memory resources, data bus speeds and other performance constraints. For example, one embodiment may be implemented using software executed by a processor. The processor may be a general-purpose or dedicated processor, such as a processor made by Intel® Corporation, for example. The software may comprise computer program code segments, programming logic, instructions or data. The software may be stored on a medium accessible by a machine, computer or other processing system. Examples of acceptable mediums may include computer-readable mediums such as read-only memory (ROM), random-access memory (RAM), Programmable ROM (PROM), Erasable PROM (EPROM), magnetic disk, optical disk, and so forth. In one embodiment, the medium may store programming instructions in a compressed and/or encrypted format, as well as instructions that may have to be compiled or installed by an installer before being executed by the processor. In another example, one embodiment may be implemented as dedicated hardware, such as an Application Specific Integrated Circuit (ASIC), Programmable Logic Device (PLD) or Digital Signal Processor (DSP) and accompanying hardware structures. In yet another example, one embodiment may be implemented by any combination of programmed general-purpose computer components and custom hardware components. The embodiments are not limited in this context.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. A method for communicating graphics overlay information to display modules, comprising:
   receiving a first video plane from a first video source and a second video plane from a second video source;
   receiving a first and second overlay plane to be blended with said first and second video planes, respectively, over a single bus, by a graphics processor;
   blending said first video plane with said first overlay plane to form a first blended line, and said second video plane with said second overlay plane to form a second blended line;
   sending simultaneously in real-time said first line to a first line buffer and said second line to a second line buffer, wherein said first line buffer and said second line buffer comprise part of a video processor; and
   supplying simultaneously in real-time by said video processor said first line from said first line buffer to a first display module at a first refresh rate and said second line from said second line buffer to a second display module at a second refresh rate.

2. The method of claim 1, wherein said blending comprises; storing said video planes in a video processor frame buffer; and storing said overlay planes in a graphics frame buffer.

3. The method of claim 2, wherein said blending further comprises:
   sending said overlay planes to said video processor frame buffer in accordance with a vertical synchronization signal;
   storing said overlay planes in said video processor frame buffer; and
   retrieving said video planes and said overlay planes from said video processor frame buffer to perform said blending.

4. The method of claim 3, wherein sending said overlay planes comprises:
   sending a first control block with a set of dimensions for said first overlay plane;
   sending a first content block with said first overlay plane;
   sending a second control block with a set of dimensions for said second overlay plane; and
   sending a second content block with said second overlay plane.

5. The method of claim 4, further comprising:
   receiving a plurality of second overlay planes; and
   storing said plurality of second overlay planes in said graphics frame buffer.

6. The method of claim 5, wherein sending said second content block comprises:
   retrieving said plurality of second overlay planes;
   forming said plurality of second overlay planes into said second content block; and
   sending said second content block with said plurality of second overlay planes.

7. The method of claim 2, wherein said blending further comprises
   receiving a first set of first overlay planes and a second set of second overlay planes;
   storing said first set in a first refresh rate domain in said graphics frame buffer, and said second set in a second refresh rate domain in said graphics frame buffer;
   sending said first overlay planes to a blending module in accordance with horizontal and vertical synchronization signals;
   sending said second overlay planes to said blending module in accordance with said horizontal and vertical synchronization signals; and
   blending said first video plane with an overlay plane from said first set to form said first blended frame, and said second video plane with an overlay plane from said second set to form said second blended frame, as said first and second sets are received at said blending module.

8. The method of claim 7, wherein said sending said first set comprises:
   sending a first control block with a set of dimensions for said first set when said vertical synchronization signal changes state; and
   sending a plurality of content blocks in accordance with said horizontal synchronization signal, with each content block having a line of said first set.

9. The method of claim 7, wherein said sending said second set comprises:
   sending a first control block with a set of dimensions for said second set when said vertical synchronization signal changes state; and
   sending a plurality of content blocks in accordance with said horizontal synchronization signal, with each content block having a line of said second set.

10. An apparatus for communicating graphics overlay information to display modules, comprising:
    a video processor to receive a first video plane from a first video source and a second video plane from a second video source;
    a graphics processor to connect to said video processor, said graphics processor to receive a first and second overlay plane to be blended with said first and second video planes, respectively, said graphics processor to send said first and second overlay planes to said video processor over a single bus;
    said video processor to have a blending module, said blending module to blend said first video plane with said first overlay plane to form a first blended line, and said second video plane with said second overlay plane to form a second blended line; said video processor to have a first and a second line buffer, said first line buffer to receive said first blended line, and said second line buffer to receiver said second blended line; and
    said video processor to send simultaneously in real-time said first line from said first line buffer to a first display module at a first refresh rate and said second line from said second line buffer to a second display module at a second refresh rate.

11. The apparatus of claim 10, further comprising:
    a video processor frame buffer to connect to said video processor, said video processor frame buffer to store said video planes; and
    a graphics frame buffer to connect to said graphics processor to store said overlay planes.

12. The apparatus of claim 11, further comprising:
    a bus to connect said video processor and said graphics processor;
    wherein said graphics processor sends said overlay planes to said video processor frame buffer over said bus in accordance with a vertical synchronization signal;
    said video processor to receive said overlay planes from said graphics processor over said bus and store said overlay planes in said video processor frame buffer; and said blending module to receive said video planes and said overlay planes from said video processor frame buffer to perform said blending.

13. The apparatus of claim 12, wherein said bus is a graphics overlay transfer bus, and said overlay planes are communicated over said graphics overlay transfer bus in accordance with the DVO specification.

14. The apparatus of claim 11, further comprising:
a bus to connect said video processor and said graphics processor;
said graphics processor to send said overlay planes to said blending module over said bus in accordance with horizontal and vertical synchronization signals; and
said blending module to receive said overlay planes from said bus and said video planes from said video processor frame buffer, said blending module to form said first and second blended frames as said overlay planes are received.

15. The apparatus of claim 11, wherein said graphics processor to receive a first set of first overlay planes and a second set of second overlay planes, said graphics processor to store said first set in a first refresh rate domain in said graphics frame buffer, and said second set in a second refresh rate domain in said graphics frame buffer, with said graphics processor to send said first overlay planes to said blending module over said bus in accordance with horizontal and vertical synchronization signals.

16. A system for communicating graphics overlay information to display modules, comprising:
a first video source module to send a first video plane and a second video source module to send a second video plane;
a graphics source module to send a first and second overlay plane to be blended with said first and second video planes, respectively;
a media center to connect to said video source module and said graphics source module said media center to comprise a video processing sub-system to receive said video planes and a graphics processing sub-system to receive said graphics planes, said graphics processing sub-system to send said graphics planes to said video processing sub-system over a single bus, with said video processing sub-system to blend said first video plane with said first overlay plane to form a first blended line, and said second video plane with said second overlay plane to form a second blended line;
a first line buffer to receive said first blended line and a second line buffer to receive said second blended line; and
a plurality of display modules, with a first display module to receive and display in real-time said first blended line at a first refresh rate, and a second display module to receive and display in real-time simultaneously with said first display module said second blended line at a second refresh rate.

17. The system of claim 16, wherein said display modules have different display formats.

18. The system of claim 16, wherein said media center comprises:
a video processor to receive said first and second video planes;
a graphics processor to connect to said video processor, said graphics processor to receive said first and second overlay planes to be blended with said first and second video planes, respectively; and
said video processor to have a blending module, said blending module to blend said first video plane with said first overlay plane to form said first blended frame, and said second video plane with said second overlay plane to form said second blended frame.

19. The system of claim 18, further comprising:
a video processor frame buffer to connect to said video processor, said video processor frame buffer to store said video planes; and
a graphics frame buffer to connect to said graphics processor to store said overlay planes.

20. The system of claim 18, further comprising a bus to connect said video processor and said graphics processor, said graphics processor to send said overlay planes to said video processor over said bus.

* * * * *